United States Patent [19]

Wiener

[11] Patent Number: 4,575,724

[45] Date of Patent: Mar. 11, 1986

[54] PARALLEL PROCESSOR CONFIGURATION FOR ADAPTIVE ANTENNA ARRAYS

[75] Inventor: Alan I. Wiener, Lexington, Mass.

[73] Assignee: The United States of America as represented by the Secretary of the Air Force, Washington, D.C.

[21] Appl. No.: 640,904

[22] Filed: Aug. 15, 1984

[51] Int. Cl.[4] .......................... G01S 3/16; G01S 3/28

[52] U.S. Cl. .................................... 343/383; 343/380

[58] Field of Search ................ 343/378, 380, 382, 383

[56] References Cited

U.S. PATENT DOCUMENTS 4,079,379 3/1978 Piesinger ...................... 343/100 SA 4,173,759 10/1979 Bakhru ......................... 343/100 LE 4,217,586 8/1980 McGuffin ..................... 343/100 LE

*Primary Examiner*—Theodore M. Blum

*Attorney, Agent, or Firm*—Donald J. Singer; Willard R. Matthews; William G. Auton

[57] ABSTRACT

A signal processing system, which operates in parallel with the outputs of sensors of an adaptive array, for quickly nulling multiple jammers. The processing system includes a set of parallel combiners and an apparatus for updating a signal weight which is applied to the sensor outputs. The parallel combiners mix a weighing function with each sensor output and provide a resultant output signal which has been cleared of interference from jamming. Part of the resultant signal is fed to the apparatus for updating the signal weighing function for further mixing with sensor outputs. The parallel operation of the combiners with each sensor output provides fast nulling effects.

12 Claims, 13 Drawing Figures

PARALLEL PROCESSOR CONFIGURATION FOR ADAPTIVE ANTENNA ARRAYS

STATEMENT OF GOVERNMENT INTEREST

The invention described herein may be manufactured and used by or for the Government for governmental purposes without the payment of any royalty thereon.

BACKGROUND OF THE INVENTION

The present invention relates to phased array sensor systems and more specifically to a signal processing system, which operates in parallel with the outputs of sensors of an adaptive array, for quickly nulling multiple jammers.

Basically adaptive antenna arrays are utilized to receive desired information signals in a predetermined frequency band while at the same time rejecting undesired interference signals in the same frequency band. To accomplish this, the information signals and inteference signals must be received from the different directions. In one typical operating environment, the antenna array is physically mounted in a guided missile; and the information signals are transmitted by the missile controller from one direction while the interference signals are intentionally transmitted by an alien source from another direction. Such interference signals are commonly known as jamming signals.

In the art, various adaptive antenna arrays have been disclosed which attempt to overcome the above described problem. These prior art arrays include LMS (least means squares) arrays, MSN (maximum signal to noise ratio) arrays, SMI (simple matrix inversion) arrays, and RS (random search) arrays. All of these arrays, and the algorithms upon which their performance is based, have been well described in the literature and, with the exception of the least means squares systems, they will not be further described herein.

Additionally, the task of eliminating jamming signals is alleviated by the prior art techniques given by the following patents: U.S. Pat. Nos. 4,079,379 issued on Mar. 14, 1978 to Piesinger; 4,173,759 issued on Nov. 6, 1979 to Bakhru; and 4,217,586 issued on Aug. 12, 1980 to McGuffin.

However none of the above references disclose a system for nulling multiple jammers which operates in parallel with each antenna of an adaptive array. Therefore while the references are improvements over the traditional LMS system (the Bakru device can suppress a single jamming signal in less than 100 microseconds) all of the above references should, like prior systems using the LMS algorithm, exhibit slow rates of adaptation when interfering sources of widely different strengths are present. The present invention overcomes this slow convergence by employing a signal processing operation in parallel with the array combiner.

SUMMARY OF THE INVENTION

The subject invention is a signal processing system, which operates in parallel with the outputs of sensors of an adaptive array, for quickly nulling multiple jammers. The processing system includes a set of parallel combiners and an apparatus for updating a signal weight which is applied to the sensor outputs. The parallel combiners mix a weighing function with each sensor output and provide a resultant output signal which has been cleared of interference from jamming. Part of the resultant signal is fed to the apparatus for updating the signal weighing function for further mixing with sensor outputs. The parallel operation of the combiners with each sensor output provides fast nulling effects.

It is a principal object of the invention to provide a new and improved means for reducing or nulling jamming signals received by the sensors of an adaptive phased array.

It is another object of this invention to null signals from multiple jamming sources located in either the main beam or the sidelobes of the antenna pattern of the adaptive phased array.

It is still another object of the invention to improve the convergence time for nulling jamming signals by employing a signal processing operation in parallel with the array combiner.

These together with other objects features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The subject invention is a signal processing system, which operates in parallel with the outputs of sensors of an adpative array, for quickly nulling multiple jammers. The processing system includes a set of parallel combiners and an apparatus for updating a signal weight which is applied to the sensor outputs. The parallel combiners mix a weighing function with each sensor output and provide a resultant output signal which has been cleared of interference from jamming. Part of the resultant signal is fed to the apparatus for updating the signal weighing function for further mixing with sensor outputs. The parallel operation of the combiners with each sensor output provides fast nulling effects.

Figure 1:
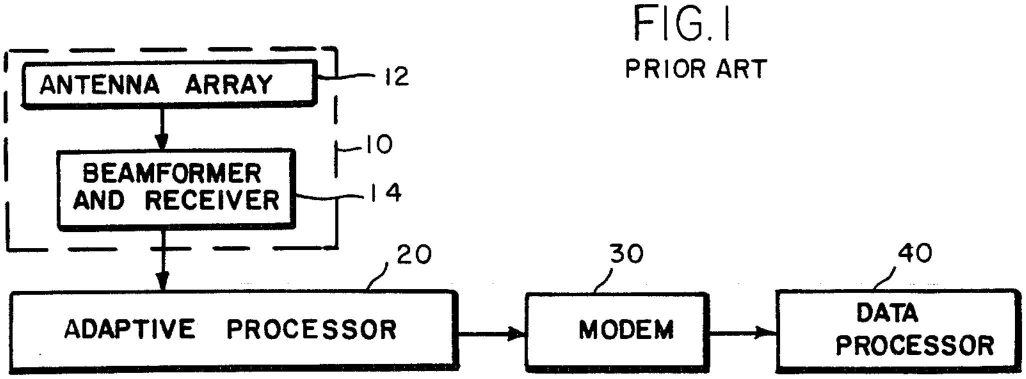
FIG. 1 PRIOR ART
FIG. 1 is an illustration of a prior art phased array antenna system equipped with an anti-jamming device.

FIG. 1 is an illustration of a prior art phased array antenna system equipped with an anti jamming device.

The Antenna system 10 consists of a phased array antenna 12 and the receiver and beamformer 14 which generates and steers the beams transmitted out of the array and receives and detects return signals.

The "anti-jam device" 20 is commonly an adaptive processor that performs the function of suppressing the signals of jammers while maintaining the gain of desirable signals. The modem demodulator 30 demodulates the received signals and generates an output digital data stream which is sent to the system data processor.

Figure 2:
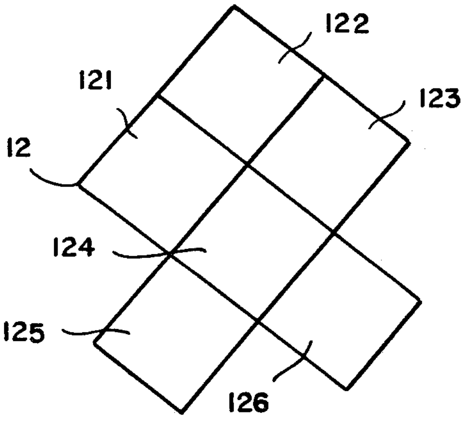
FIG. 2 PRIOR ART
FIG. 2 is a sketch of the prior art square antenna array of the system in FIG. 1.

FIG. 2 is a sketch of the prior art square antenna array 12 of the system in FIG. 1. It is divided into four subarrays 121–124 and two auxiliary antennas 125 and 126. This square antenna array produces four inputs $V_1$, $V_2$, $V_3$ and $V_4$ of received signals from each subarray which are separately input into the adaptive processor 20 where the components of jamming signals will be removed.

Figure 3:
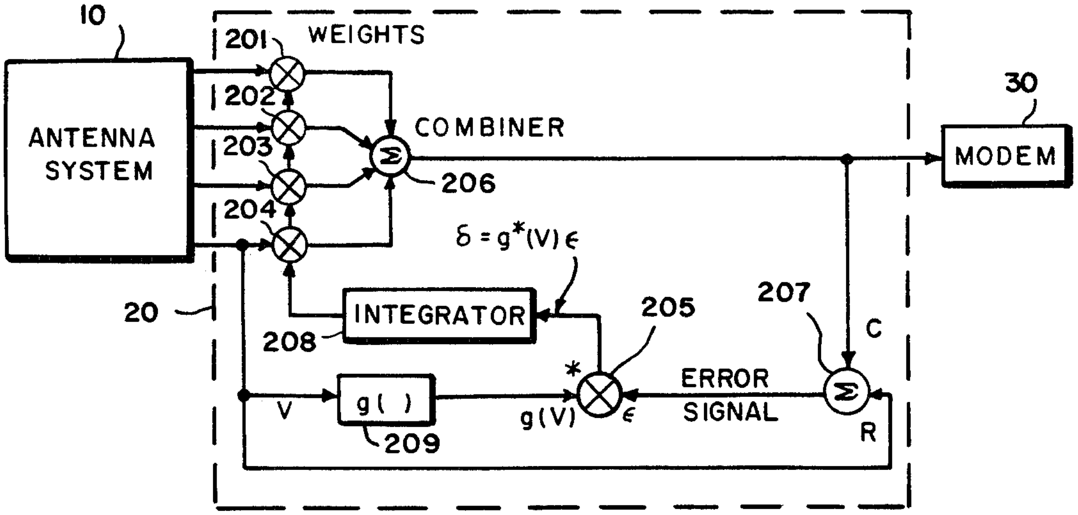
FIG. 3 PRIOR ART
FIG. 3 is an illustration of the functional blocks of a prior art processor as used to suppress jamming signals.

FIG. 3 is an illustration of the functions performed by a prior art adaptive processor 20 as used to suppress jamming signals. The adpative processor suppresses jamming signals while providing maximum gain to desired signals through the use of: five complex multipliers 201–205, two combiners 206, 207, an integrator 208 and one non-linear element 209.

The received signals from each of the four subarrays (121–124 of FIG. 2) in the antenna system 10, are separately input into and weighted by their corresponding complex multiplier 201–204, and summed by the combiner 206. The algorithm implemented allows the array to divert nulls toward jammers while focusing on the desired signal.

Application of this technique assures the existence of a "desired" or "reference" signal, R, from which the array combiner 207 output, C, is subtracted to produce an error signal. Here, the reference signal is taken from one of the subarrays of the antenna 10. The algorithm implemented by FIG. 3 attempts to adjust the weights to minimize the mean-square error, and is called the LMS algorithm. The error signal, $\epsilon$, is multiplied 205 by a beamport signal which has generally been passed through a nonliner operation 209, such as hardlimiting, and integrated 208 to produce the control for the weight associated with that beamport signal.

In FIG. 3 the actual weight settings are the output of correlators, i.e., multipliers followed by integrators. When the multiplier output drops to zero, the integrator output (i.e., the correlator output) is fixed and the weight has reached its steady-state value. In essence, the feedback loop works to set the correlation between the two multiplier inputs in FIG. 3 to zero, i.e., $$\overline{\delta}=\overline{\epsilon g^*(V)}=0;\text{ steady-state} \quad (1)$$

where we have denoted the nonlinear operation 209 in FIG. 3 as g(.). The nonlinear operation is selected so that $$\overline{\epsilon g^*(V)}\sim\overline{\epsilon V^*} \quad (2)$$

Thus, $$\overline{\epsilon g^*(V)}=0\rightarrow\overline{\epsilon V^*}=0 \quad (3)$$

and, under steady-state conditions, the error signal is uncorrelated with all the input signals from the array.

Under transient conditions, this correlation will not be precisely zero. The loop gain of the feedback loop in FIG. 3 depends directly upon the size of the signals at the multiplier inputs. This may be seen from the fact that an increase in these voltages increases the multiplier output, and thus is indistinguishable from turning up the gain after the multiplier.

As is well-known, the higher the loop gain, the faster the settling time of a feedback loop. However, there are practical and theoretical limitations on the size of loop gain that may be achieved. Dynamic range limitations set upper limits on voltage levels. However, even if these dynamic range limitations did not exist, an upper bound on loop gain would be set by stability considerations and by "weight noise". The latter phenomenon arises from the fact that the correlator is averaging random signals and thus has a random fluctuating component at its output. This weight noise must be kept small to prevent performance degradation in the modem. It is clear, by inspection of FIG. 3, that weight noise will increase with loop gain. Attempts to increase the loop gain to reduce adaptation time eventually produce an intolerable amount of weight noise and instability.

The prior art system of FIG. 3 has limited effectiveness in the case of two jammers, both large compared to the desired signal but of considerably different power level. For example, suppose that these jammers appear in all of the beamports and auxiliary antennas. Since the strongest jammer controls the voltage levels at the input to the multipliers, it will determine the adaptation time constant for its own nulling by the correlation loop. Thus nulling can be quite rapid. However, after it is nulled, the weaker jammer will appear as the strongest signal at the combiner output and right-hand input to the multipliers. Unfortunately, since it is at a considerably reduced level, the loop gain for its nulling is much smaller and it will take much longer to null. For example, it may be shown that if it is 20 dB below the stronger jammer, then it will take roughly 20 dB or 100 times longer to be nulled. Any attempt to increase the gain after the strong jammer is nulled, say by AGC, in order to reduce adaptation time will fail because the strong jammer will then have too much loop gain and the system will go unstable.

The problem is even more severe in regard to SNR maximization because the tropo signal is the weakest of all. Thus, if the signal were 40 dB weaker than the strongest jammer, one could expect a time constant 10,000 times longer for SNR maximization (or, equivalently, diversity combining) after the weakest jammer has been nulled.

Figure 4:
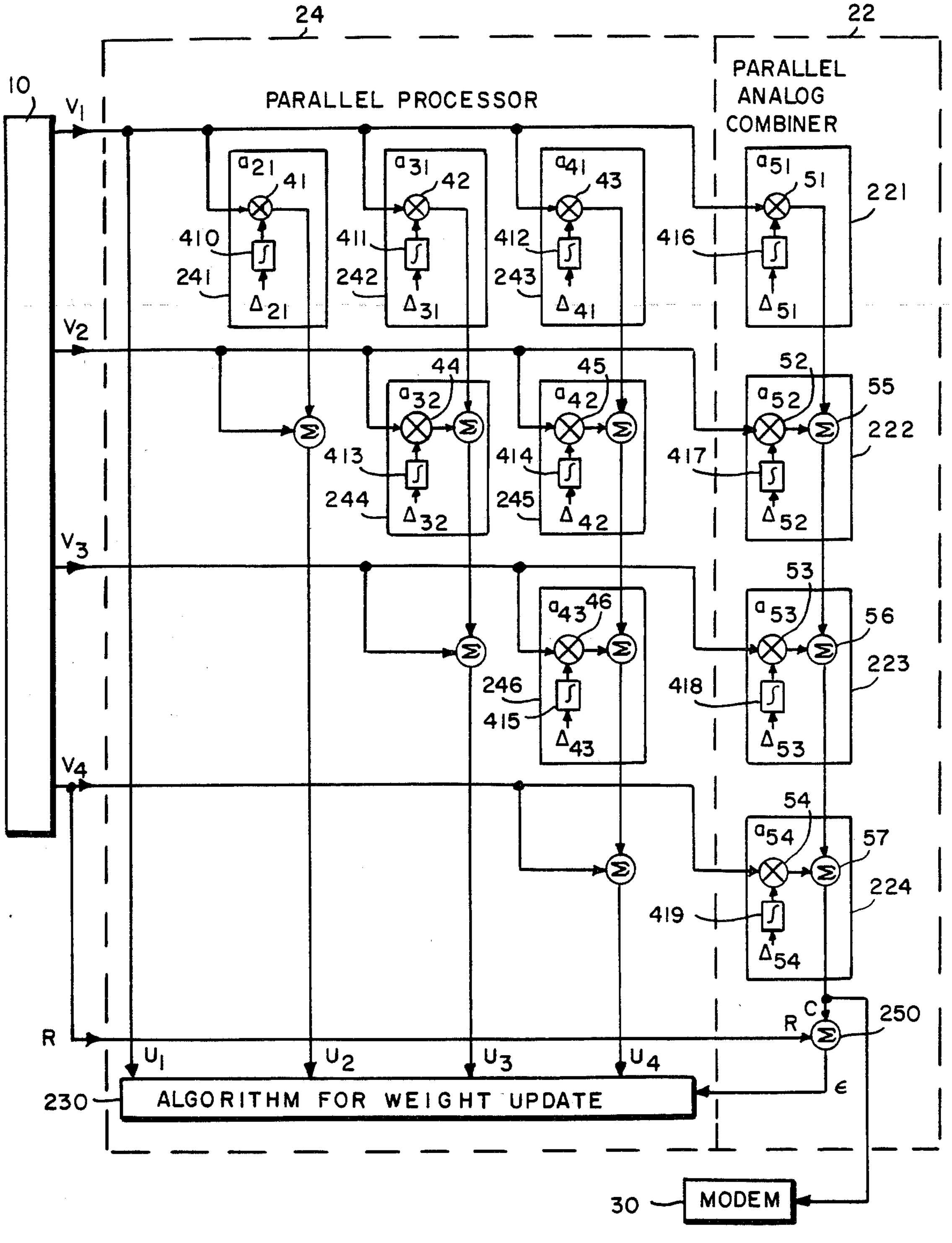
FIG. 4 is an illustration of one embodiment of the present invention.

FIG. 4 is an illustration in which the present invention is used as the "anti-jam" device 24 for the phased array atenna system of FIG. 1. The inventon is divided into two systems which work together to cause the receiver antenna pattern to have nulls directed towards jammers while maximizing the gain of arriving desirable systems.

The first system is the set of N parallel analog combiners 22, N being an integer equal to the number of subarrays used in the antenna system 10. In the example there are four subarrays having sensor outputs $V_1$, $V_2$, $V_3$ and $V_4$ which are each fed into the four parallel analog combiners 221–224 where each of the parallel analog combiners 221–224 weight the sensor outputs in complex multipliers 51–54. The weighted sensor output signals are then each sumed by combiners 55–57 into the combiner output C.

The combiner output C plus a reference signal R (the output signal taken from Nth subarray) enter an error generator 250 which generates an error signal $\epsilon=R-C$ which enters the algorithm circuit 230 which is used to generate the weight update values with each set of retain signals received from the antenna system. In other words, each of the output weight values in the parallel analog combiners 221-224, which is indicated by $\{A_{5n};\ n=1, \ldots, 4\}$ in FIG. 4 is updated periodically by feeding weight update values $\{\Delta_{5n};\ n=1, \ldots, 4\}$ into the accumulators 416-419. These weight update values are generated by the algorithm circuit 230 for the parallel analog combiners using the algorithm $$\Delta_{5n}=\gamma_{5n}\epsilon \text{ where } \epsilon=R-C \tag{4}$$

as well as the update values for all the parallel digital combiners 241-246 in the parallel processor 24 where the update values $\Delta_{mn}$ are determined by the algorithm that incorporates equation 4:

$$\Delta_{mn}=\gamma_{mn}U_m \tag{5}$$

The parallel processor 24, produces the quantities $\{U_n;\ n=1, \ldots, 4\}$ where $U_n$ is the output of the nth parallel combiner. Thus, $U_n$ is obtained by weighting the sensor inputs by the weights $a_{n1}, 2_{n2}, \ldots, a_{nn}$, where $a_{nn}=1$ and $n=1,2, \ldots, 4$ for FIG. 3. As for the analog combiner 22, each of the weight values is obtained by feeding weight update values, $\Delta_{mn}$, into accumulators as described below.

Each one of the outputs $U_1, U_2, \ldots, U_{N-1}, U_N=\epsilon$ may be computed simultaneously from the inputs $V_1, V_2, \ldots, V_{n-1}, V_N=R$. The parallel combiner 22 output, is given by $C=R-\epsilon$ as discussed above, which means that the input to the last summer 57 in the last column must be $-C$.

The last column of weighting would be implemented with analog processing. However, the preceding processing, the parallel processor per se, can be carried out with digital processing since its sole function is to provide weight updates to the analog combiner.

As mentioned above, the adaptive processor is the unit 230 that implements the following iterative algorithm to provide the weights updates, $\Delta_{mn}=\gamma_{mn}U_m$:

$$\gamma_{m+1,n}=\gamma_{mn}-(a_{mn}+\Delta_{mn})g^*(U_m)=-g^*(U_m)a_{mn}'+\gamma_{mn} \tag{6}$$

where $$a_{mn}'=a_{mn}+\Delta_{mn} \tag{7}$$

is the updated mn weight, and $$\gamma_{mn}=\Delta_{mn}/U_m \tag{8}$$

Note that $$\Delta_{pq}=\gamma_{pq}=0;\ p\leqq q \tag{9}$$

$$a_{pp}=1 \tag{10}$$

so that $$\gamma_{m+1,m}=-g^*(U_m) \tag{11}$$

The nonlinear function g(.) is used to make the adaptation time constant independent of input sensor power level.

A particular nonlinear function g(.) which is practical to implement digitally and has been simulated is given by $$g(U_n)=\frac{Sgn(X_n)+j\,Sgn(Y_n)}{(|X_n|+|Y_n|)} \tag{12}$$

Figure 5:
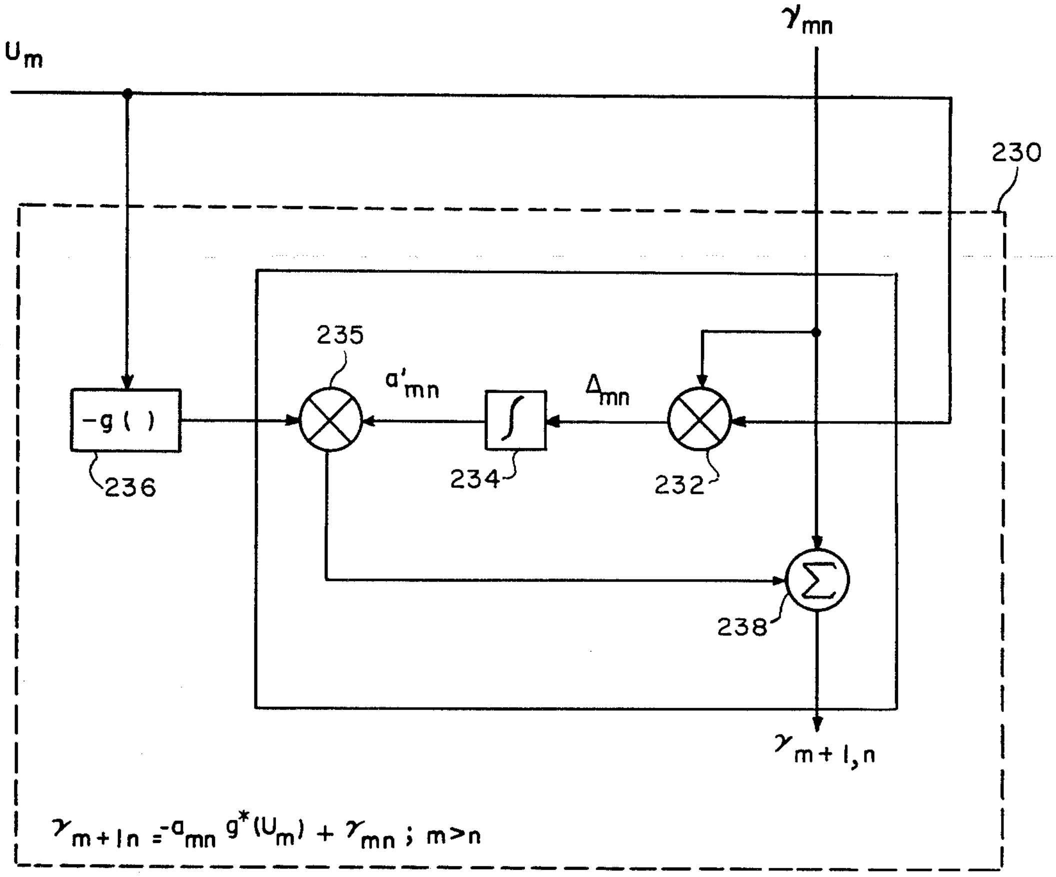
FIG. 5 is an illustration of the algorithm circuit of the present invention.

FIG. 5 illustrates that basic signal processing operations used to implement the algorithm of equation 6 and element 230 of FIG. 3. In the proposed system, the device in FIG. 4 is time-shared repeatedly to carry out the required preprocessor operations. The weight updates for the last column of FIG. 3, namely the analog parallel combiner 22, are given by $$\Delta_{5n}=\gamma_{5n}\epsilon \tag{13}$$

As illustrated in FIG. 5, the algorithm $$\gamma_{m+1,n}=-a_{mn}g^*(U_m))+\gamma_{mn};$$

$m>n$ is performed using two multipliers 232 and 235, an integrator 234, a non-linear element 236 which performs the $-g(.)$ function, and a summing junction 238. Thus, the $\gamma_{5n}$ outputs are multiplied by the error signal and fed to separate integrators to form the analog combiner weights.

The rationale for the parallel processor approach derives from an examination of the equations relating the inputs $V_n$ and the uncorrelated outputs $U_n$:

$$V_n=\sum_{k=1}^{n} U_k w_{nk};\ n=1, 2, \ldots, N \tag{14}$$

where we have define $w_{nk}$ as the weight to be applied and:

$$w_{nn}=1 \tag{15}$$

Equation (14) assumes an N-input processor. As discussed in the previous section the last input $V_N$ is the reference R and the last uncorrelated output $U_N$ as the error signal formed at the combiner output.

Equation (14) may be inverted to express the uncorrelated outputs in terms of the inputs:

$$U_n=\sum_{k=1}^{n} V_k a_{nk} \tag{16}$$

where $$a_{nn}=1 \tag{17}$$

Given that the $a_{nk}$ weights may be determined by a suitable algorithm, the block diagram in FIG. 4 implements Eq. (16).

Figure 6:
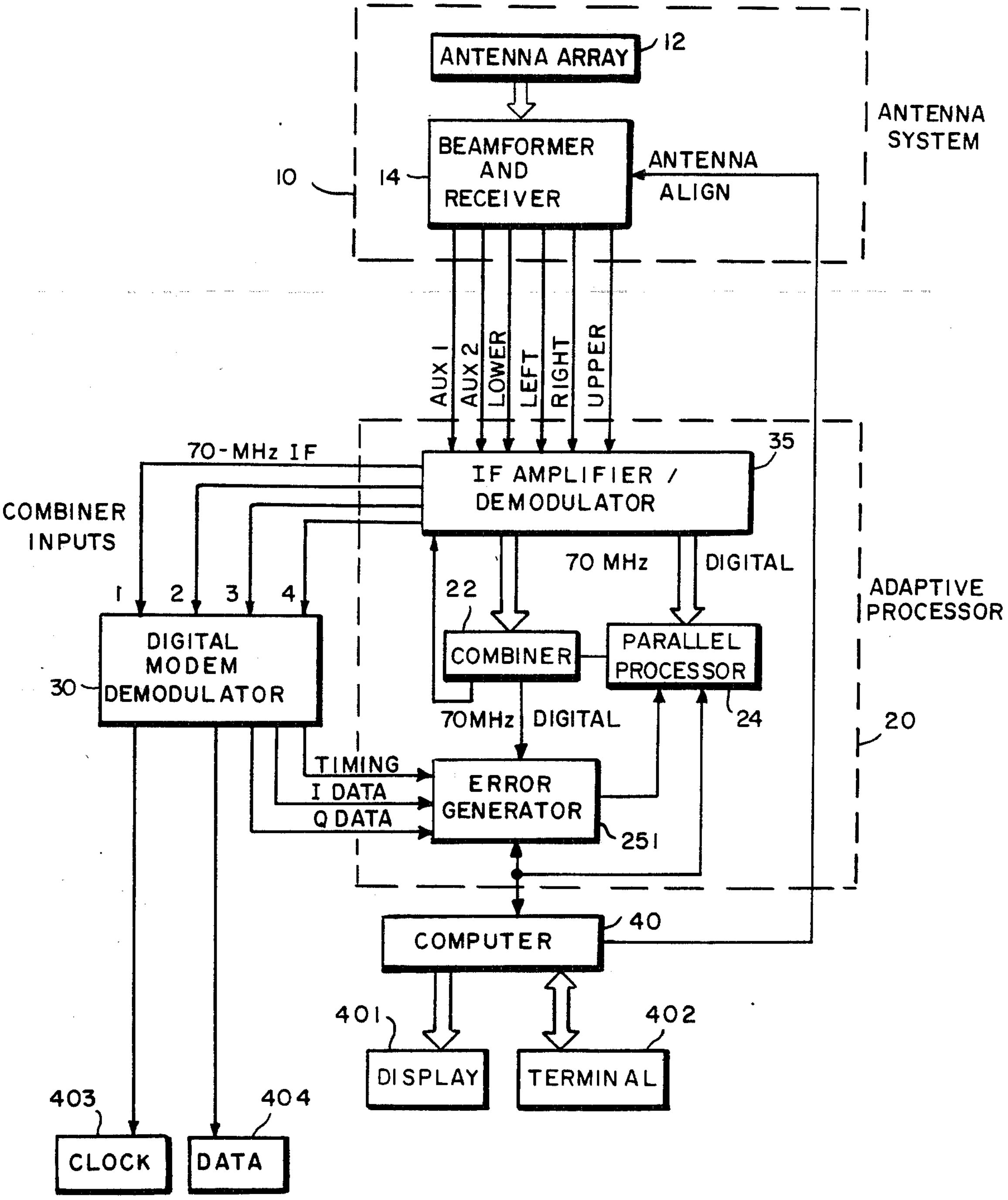
FIG. 6 is an illustration of another embodiment of the present invention.

FIG. 6 is an illustration of another embodiment of the present invention. It is similar to the embodiment of FIG. 4 in that the adaptive processor 20 receives signals from an antenna system 10 containing a beamformer and receiver 14 and a phased array antenna 12 with four subarrays and two auxiliary antennas.

The antenna system 10 receives input signals consisting of desired signal returns plus jamming signals.

The local oscillator down-converts these input signals to an IF near 70 MHz. They are available at the six IF beamports consisting of the lower, left, right, and upper subarrays in the antenna array 12 and the two auxiliary antennas. There are no significant desired signals on the auxiliary beamports. Alignment of the beam cluster is accomplished by responding to appropriate commands from the computer 40.

The six beamport signals provide inputs to the IF Amplifier/Demodulator subassembly 35. One function of this unit is to route either the beamport signals or the processed combiner output signal to the DAR demodulator input. In the "TROPO" mode, the lower, left, right, and upper beam channels are routed directly to the modem for quadruple-angle diversity. No jammer suppression is provided since the processed combiner output signal is not used by the modem 30 although the Adaptive Processor is functioning. In the "ECCM" mode, the beam cluster is removed from the modem input and the processed combiner output is substituted for one input. The remaining three inputs to the modem 30 are terminated. Jammer suppression is provided in this mode.

The Adaptive Processor consists of the parallel analog combiner 22, parallel digital processor 24, and related error generator 251. The computer 40 monitors various signals throughout the system to determine the jammer status and monitor performances. The computer 40 also can perform the functions of antenna alignment.

One of the features that distinguishes this embodiment from the embodiment of FIG. 4 is the function of the error generator 251. The error generator of FIG. 4 is a summing means which receives the reference signal R from the last subarray in the antenna array 12, and a combined output C from the parallel analog combiner 22, and computes the error signal $\epsilon = R - C$.

The error generator 251 of FIG. 6 receives the reference signal in the form of In-phase (I) and Quadrature (Q) data streams as well as a system timing signal which is in synchronization with the system clock 403 from the digital modem demodulator 30.

The parallel processor 24 and parallel analog combiner 22 function as described earlier in FIG. 4 except the combiner 22 sends a digital combiner signal C to the error generator 251 which is used in conjunction with the reference signal to create the error signal $\epsilon$ which is sent to the system computer 400. The entire system output is the serial data stream at 1.75 Mb/s which is stored in a data base 404. Performance of the system is judged by determining the error rate properties of the 1.75 Mb/s data output both with and without jammers present.

Figure 7:
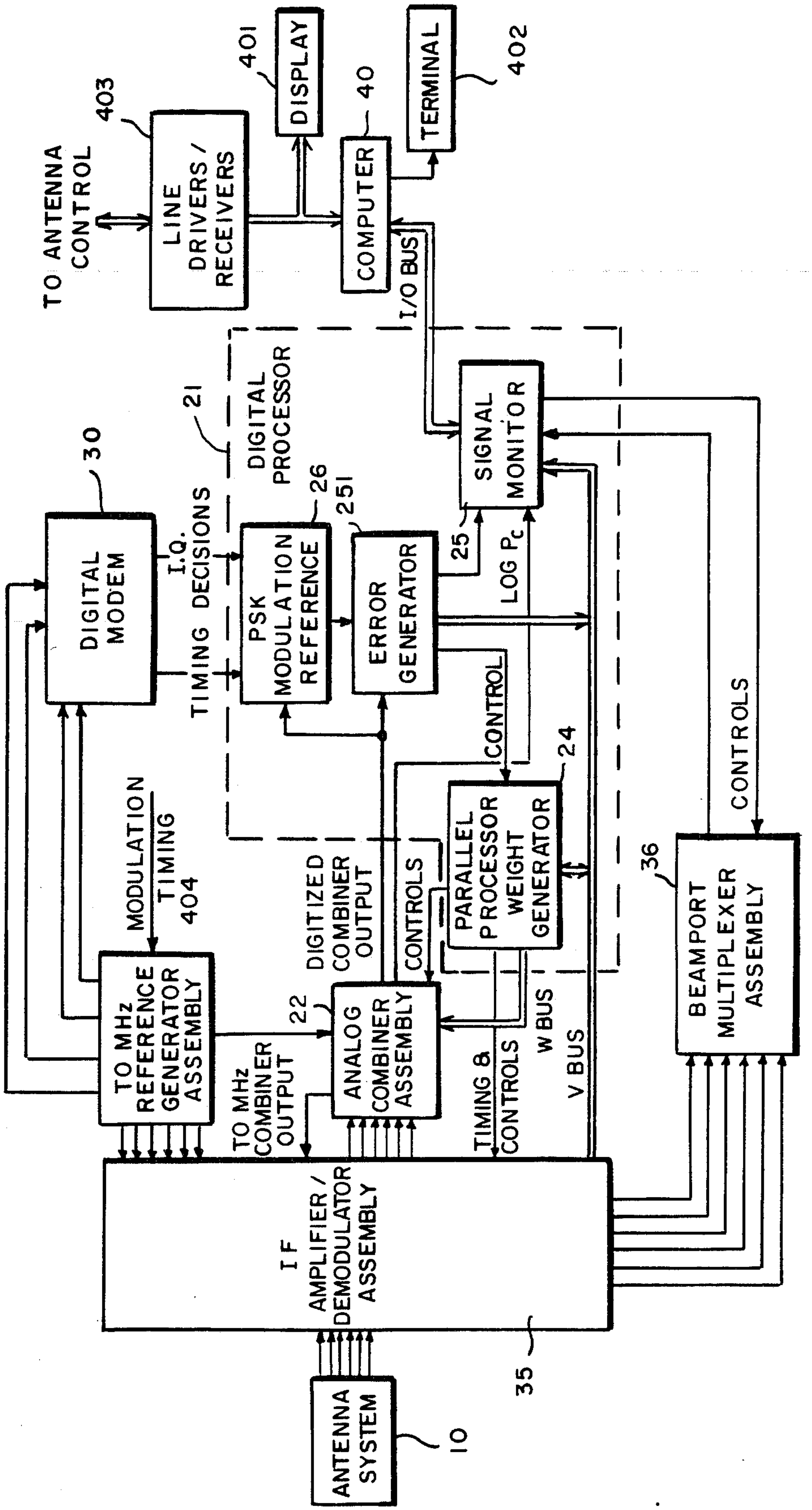
FIG. 7 is a more detailed block diagram of the invention embodied in FIG. 6.

FIG. 7 is a more detailed block diagram of the invention as embodied in FIG. 6, showing the Adaptive Processor system assemblies. Beamport inputs are from the 70 MHz IF outputs from the antenna subsystem 10. The IF Amplifier/Demodulator assembly 35 consists of the input bandpass filter, IF amplifier and related AGC and power divider to drive the equalizer/combiner assembly, the beamport multiplexer assembly, and the internal complex down-converting demodulators and high-speed digitizing circuits.

The taped-delay line equalizer together with the combiners necessary for six channels are included in the combiner assembly 22.

The digital processor portion 21 of the adaptive processor system consists of the error generator 251 and related PSK modulation reference 26, the parallel processor and weight generator 24, and signal monitor 25 whose output interfaces the PDP-11/03 computer 40.

The parallel processor 24 accepts conditioned samples of the digitized beamport signals from the input control circuits located in the IF amplifier/demodulator assembly 35. The processor correlates these signals with an error signal formed by the error generator 251 and transfers the resulting updated weight values to the weight control circuits located in the combiner assembly 22.

The error generator 251 calculates the error by comparison of the digitized combiner output from the equalizer/combiner assembly 22 with either decisions from the modem 30 or a known transmitted reference, as selected by the PSK modulation reference 26.

The PSK modulation reference 26 supplies the decision from the modem 30 to the error generator 251 when the system is operated in the decision-directed mode. If the system is operated in the transmitted-reference mode, the PSK modulation reference 26 supplies the reference sequence (in place of the modem decisions) to the error generator. In both cases baud timing is obtained from the modem.

Figure 8:
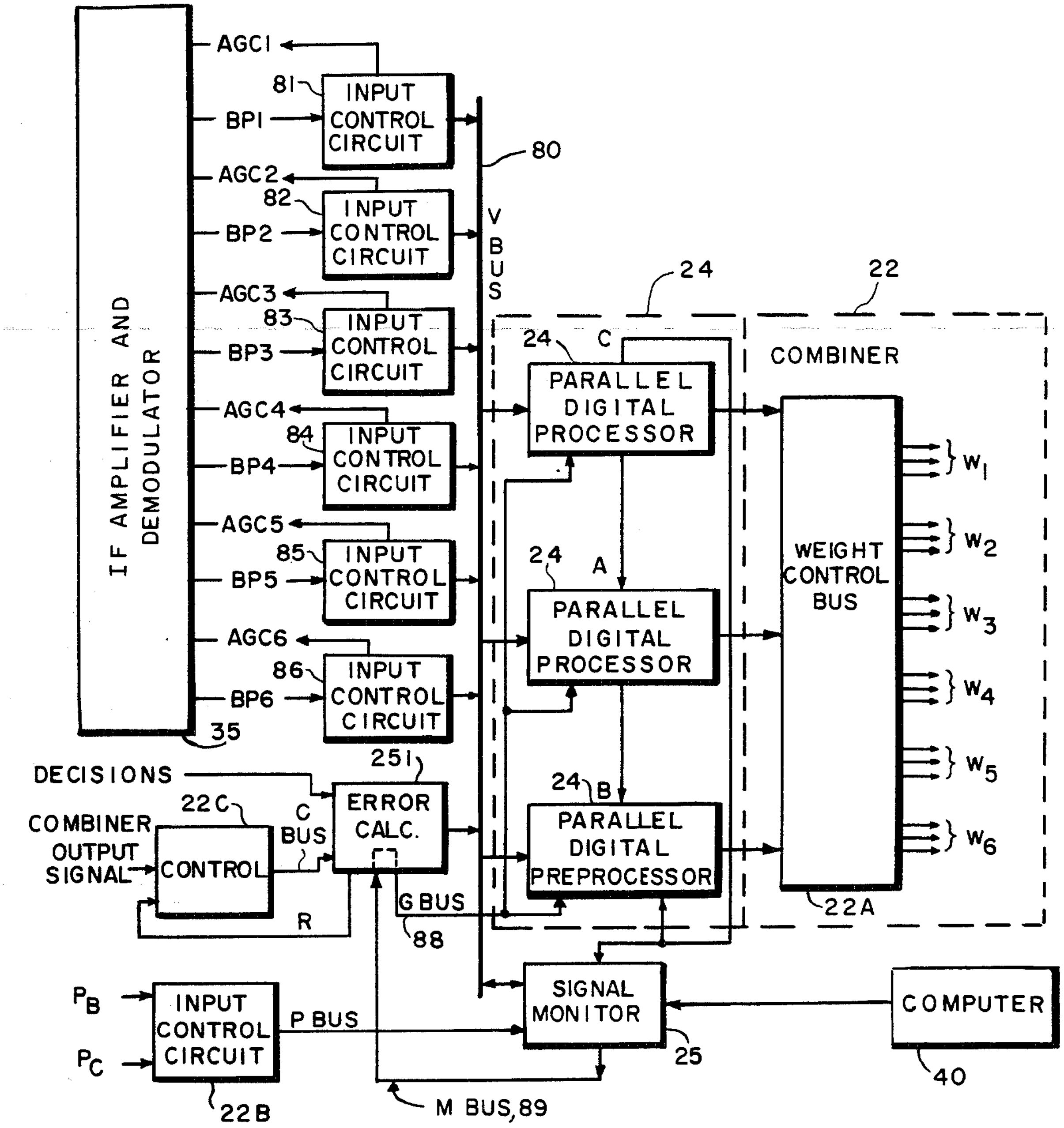
FIG. 8 depicts the operation of the parallel processor of FIG. 7.

FIG. 8 is a block diagram depicting the operation of the parallel processor assembly 24 within the digital processor 21 of FIG. 7. The parallel processor 24 samples the six quadrature phase demodulated beamport signals from the IF amplifier/demodulator assembly 35. The digital processor 21, further samples the quadrature phase demodulated combiner output from the combiner assembly 22, the digital QPSK decision and baud timing signals from the modem 30. It functions to process its input samples to control the weight control circuits located in the combiner assembly 22 in a manner which tends to make the demodulated combiner output correspond to the indications of the modem decisions.

The I and Q quadrature demodulated beamport signals are each digitized by an A/D converter. The sequence of digitized complex values of each beamport is summed by three integrators which are located on a beamport input control circuit. The three integration periods are equal in length (17 bauds) but slightly delayed relative to each other (in correspondence to the three 71.4 ns delay taps of the equalizer/combiner assembly).

Each of these 18 integrated values is sampled and stored at the end of the integration period. During the succeeding integration period, the stored $V_n$ values are each impressed on the V BUS 80 (one at a time) as an input to the three parallel digital processors 24A, 24B and 24C.

The three parallel digital processors 24A, 24B and 24C are interconnected to form a three-tap, eighteen-stage recycling shift register.

Each of these eighteen stages is allocated as an uncorrelated value ($U_m$) accumulator. As each accumulator becomes accessible to each of the parallel digital processors 24A, 24B and 24C, the processor multiplies its V BUS input value ($V_n$) times the appropriate internally-stored weight value ($a_{mn}$) and adds the product to the value in the accumulator.

Each $V_m$ value is composed of the sum of a different number (m) of $a_{mn}V_n$ products. The calculation of one $U_m$ value is completed each time all 18 accumulators have been accessed (three at a time) by the combination of processors. Each completed $U_m$ vaue is sampled and stored by the signal monitor and then impressed on the V BUS (between $V_n$ values) as an input to the three parallel digital processors.

The sign and identity of the largest I or Q component of the $U_m$ value is identified by the signal monitor and then indicated to the three parallel digital processors as $U_n$. The magnitude of this component is entered into the designated $|\overline{U_m}|$ filter of the signal monitor.

A $g_m$ value is generated from the filtered $|\overline{U_m}|$ value and sent to the error calculator by way of the M BUS 89. Each $g_m$ value is sampled by the error calculator and then latched on the G BUS 88 for use by the three parallel digital processors.

As each $U_m$ value calculation is completed, its accumulator becomes available for reassignment as a $_{mn}$ accumulator. As each $\gamma_{mn}$ accumulator becomes accessable to each of the parallel digital processors, the processor multiplies its G BUS input value ($g_m$) times the internally-accessed and updated weight value ($a_{mn}$) and then multiplies this product times the signal monitor supplied }$U_m$≡ value. The resulting $a_{mn}'g_m(U^*_m)$ product is then summed with the $\gamma_{mn}$ value to generate its replacement $\gamma_{m+1n}$ value in the accumulator.

As each $\gamma_{m+1n}$ value is calculated, it is multiplied by the V BUS 80 supplied $U_{m+1}$ value. The resulting $\sigma_{m+1n}$ value is then summed with the internally accessed $a_{m+1n}$ value to form the updated $a_{m+1n}'$ value.

The 18 equalizer/combiner assembly weights correspond to the processor stored weights which may be identified as $a_{19\,1}$ through $a_{19\,18}$. When these weights are updated, the error calculator generated error value ($\epsilon$) is used instead of the processor generated $U_{19}$ value. A copy of each updated $a_{19n}'$ value is transferred to the combiner assembly 22 by the weight control bus 22A.

The I and Q quadrature demodulated combiner signals are each digitized by an A/D converter. The sequence of digitized complex values is summed by two integrators which are located on the combiner input circuit.

One integrator period corresponds to the center integration period of the beamport input control circuits (with a relative delay equal to the signal path delay between the beamport demodulators and the combiner demodulator). This integrated value is sampled and stored at the end of each integration period for later transfer over the C BUS to the error calculator 251 as the $V_C$ value.

The other integrator period corresponds to the modem indicated baud period. This integrated value is sampled and stored at the end of each baud period and then transferred over the C BUS to the error calculator 251 as the $v_r$ value.

An error calculator supplied reference value (R) is integrated by a third integrator in the combiner input control circuit 22B during each DAR modem indicated baud period. This integrated value is sampled and stored at the end of each baud period and then transferred over the C BUS to the error calculator as the $v_D$ value.

The error calculator 251 multiplies each $v_D$ value times the modem decision value (of ±1 or ±j) for the corresponding baud. The products are then summed by the error calculator 251 for a period which corresponds to the $V_C$ integration period. The $V_C$ value is then subtracted from this total ($V_D$) to obtain the error value ($\epsilon$). This value is stored and then impressed on the V BUS when required as input to the parallel digital processors.

Each $v_r$ value is multiplied times the conjugate of the modem decision value for the corresponding baud. The products are summed by the error calculator 251 for a period which corresponds to the $V_C$ integration. The total received value (r) is stored and then transferred to the signal monitor 25 by way of the V BUS. The in-phase ($\overline{r_I}$) and quadrature ($\overline{r_Q}$) components (of r) are each entered to its designated $r_I$ or $r_Q$ filter in the signal monitor 25. A $g_r$ value is generated from the filtered components ($\overline{r_I}$ or $\overline{r_Q}$) with the largest magnitude. The two filtered components ($\overline{r_I}$ and $\overline{r_Q}$) and the $g_r$ value are each transferred from the signal monitor 25 to the error calculator 251 by way of the M BUS 89. Each of the $\overline{r_I}$ and $\overline{r_Q}$ components is then multiplied times the $g_r$ value to form the complex reference value R. This value is stored and made available to the combiner input control circuit 22B by the error calculator 251.

The multiplexed and log amplified beamport signal ($P_B$) and the log amplified combiner signal ($P_C$) are each digitized by an A/D converter. The sequence of digitized values of each of these signals is summed by an integrator in the P input control circuit (only the I component portion of each integrator is used). The integration perioid is equal to a DAR modem 30 indicated baud period. At the end of each baud period the $P_B$ and $P_C$ integrators are sampled and their integrated values are stored.

Every second baud period, the integrated $P_B$ value is impressed on the P BUS. The $P_B$ multiplexer is then sequenced (by the program cycle control) to select the next beamport, and the following switching transient contaminated integrated value is ignored. After all six beamports have been sampled by the multiplexer, and their integrated values impressed on the P BUS, one of the $P_C$ integrated values is impressed on the P BUS.

The P BUS sequence is repeated every 17 baud periods. Each of the P BUS values is entered to the appropriate $P_1$ through $P_6$ or $P_C$ filters of the signal monitor.

A computer interface is provided through the signal monitor 23. This interface allows the computer to sample the signal monitor filters. Provision is also made for the computer to sample the V BUS and the shift register U/γ accumulators of the parallel digital processors.

A command linkage is provided between the computer and the signal monitor to place the ECCM system in any of six power nulling conditions, a weight freeze condition, or the normal operating condition.

In FIG. 8 there are six input control circuits 81–86.

An input control circuit is provided for each of the beamport channels. This circuit maintains optimum performance of the beamports analog-to-digital (A/D) converters by controlling the input AGC amplifier. It also functions to integrate the digitized input signal for discrete increments of time and then provide each integrated value to the parallel digital preprocessor 24.

The signal monitor circuit 25 samples the magnitude or power level of various input, output, and intermediate signals, filters the samples, and provides the resulting filtered values to the computer 40.

The principal difference between the embodiment of FIG. 8 and the embodiment of FIG. 4 rests primarily in the source of the reference signal and the changes in the error generator 251. In FIG. 4 the reference signal is simply a received input signal from the last subarray in the antenna system 10. In the embodiment of FIG. 8, the error generator 251 receives In phase (I) and Quadrature (Q) data from the modem 30. The details of the error generator 251 to accommodate this are discussed at the conclusion of this description.

Figure 9:
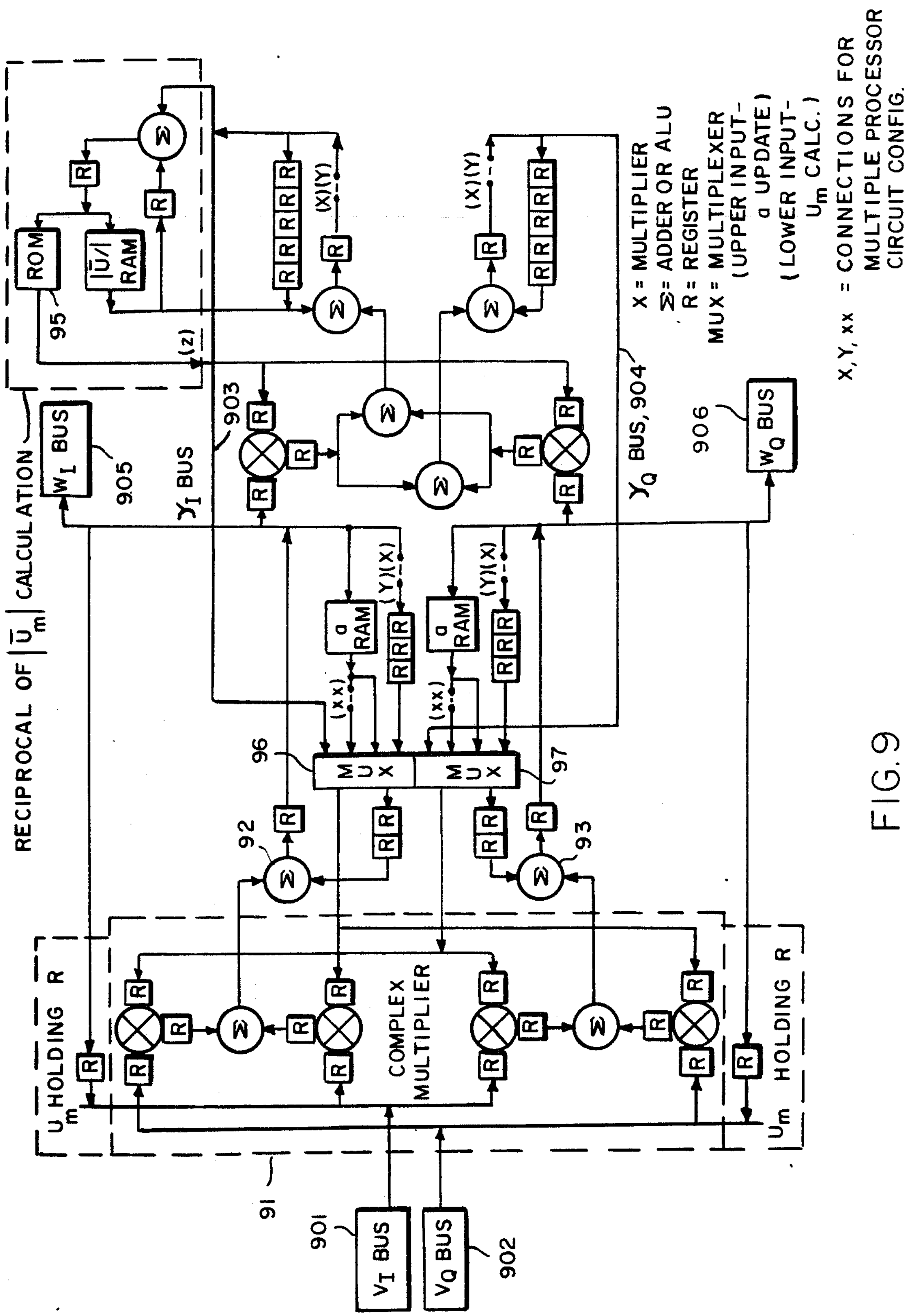
FIG. 9 is a block diagram of one of the parallel digital processors of FIG. 8.

FIG. 9 is a block diagram of one of the parallel processor circuits in 24A, 24B and 24C of FIG. 8. The parallel processor 24 in the embodiment of FIG. 8 has the same function as the parallel processor in FIG. 4: to use the error signal values produced by the error generator 251 to update the weight control values of the combiner 22. This circuit functions as a logic pipeline with the functions illustrated in FIG. 10: two complex multipliers 101 and 102 an accumulator 103 and a summing means 104 providing the output.

Figure 10:
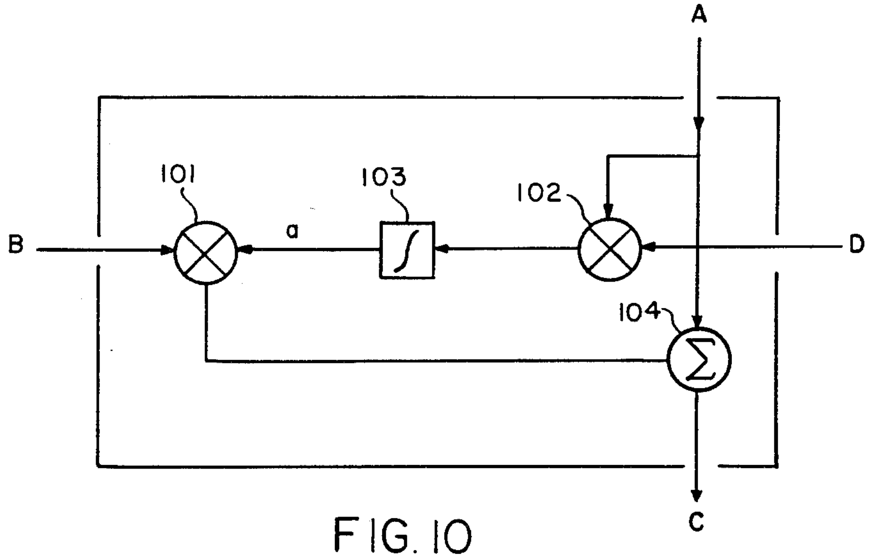
FIG. 10 is a block diagram of the logic functions of the parallel digital processor of FIG. 9.
Figure 11:
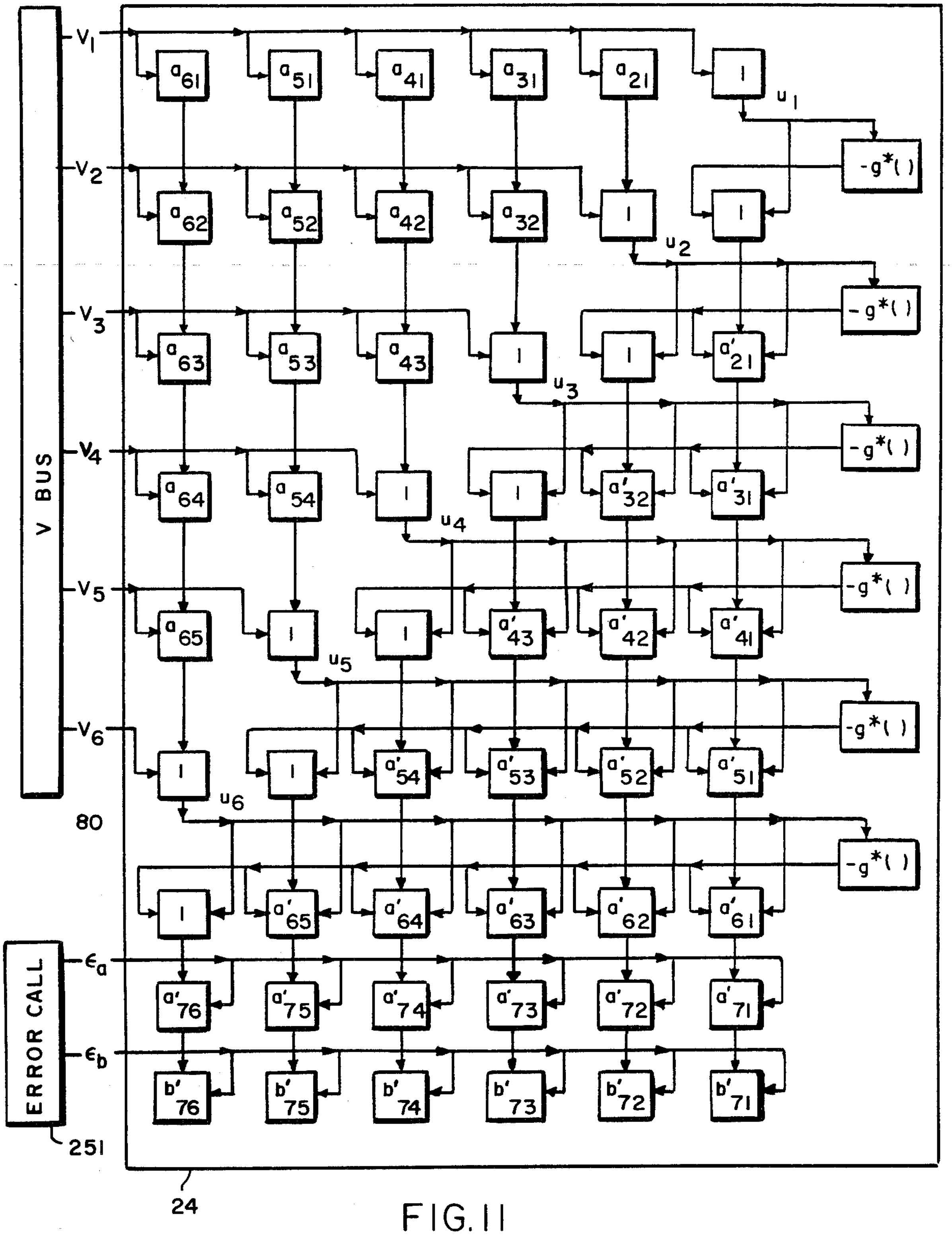
FIG. 11 is a block diagram of the elements of the parallel processors of FIG. 8.

FIG. 10 is an element of the example 6 port parallel processor matrix illustrated in FIG. 11. FIG. 11 is a block diagram of the elements of the parallel processor 24 of FIG. 8 which uses the same design principles as the parallel processor 24 of FIG. 4. The parallel processor 24 consists of: a set of parallel combiners which generate the uncorrelated signal values $U_m$; and the unit that implements the algorithm of equation 6 to update the signal weights.

For any phased array sensor system with N subarrays, the parallel processor has a total of N rows of parallel combiners. FIG. 11 treats the two auxiliary antennas as subarrays (which they are) and has a total of 6 rows of parallel combiners receiving input signals from the V Bus 80. Note that each nth row in the matrix has a total of $N-m$ parallel combiners; $(n=1,2,3, \ldots N)$ producing the uncorrelated signals $U_m$. The remainder of the elements in FIG. 11 are for implementing the algorithm.

The uncorrelated ($U_m$) signal values are generated by the upper-left triangle of the matrix in FIG. 11. As each integrated signal value is entered, the indicated element multipliers ($a_{mn}$) are sequentially obtained from an internal dual random access memory (a RAM). The complex product of the entered value times each multiplier is generated through use of four (LSI) array multipliers and two (MSI configurated) adders in the complex multiplier 91. Each product is added to the corresponding complex sum of the previous element of the same column (or to zero during the first row of the matrix) by two additional (MSI configured) adders 92 and 93. The resulting complex sum is entered into a dual shift register to make it available for summation with the complex product of the next element of the same column.

Each uncorrelated ($U_m$) signal value calculation is completed during a unique row and unique column, at the boundary between the upper-left triangle and lower-right triangle of the matrix. The calculation pipeline provides the $U_m$ value for stroage in a dual holding register for use during the next row, when it is required as an input to the lower-right triangle of the matrix.

The $U_m$ value is also provided through a pair of array multipliers (with unity as the other input) to a pair of (MSI configured) arithmetic logic units (ALU). The sum of the magnitudes of the in-phase and quadrature components of the $U_m$ value is provided by one of the ALU's. The corresponding average magnitude value is provided by the $|\overline{U_m}|$ random access memory ($|\overline{U}|$ RAM) and then subtracted from the ALU provided magnitude sum by a third ALU. This difference, multiplied by a fixed negative power of two (wired right-shift) is then added to the average magnitude value (by a dedicated adder) to form the updated $|\overline{U_m}|$ value. The $|\overline{U_m}|$ value in the $|\overline{U}|$RAM is then replaced by the updated $|\overline{U_m}|$ value. A read-only-memory (ROM) 95 provides a scaled reciprocal of the updated $|\overline{U_m}|$ value to the two array multipliers for storage (in their input registers) and use by the lower-right triangle of the matrix. (During power nulling, this ROM is controlled to provide a value of zero for the following row when required to freeze the equivalent serial combiner weight.)

The element multipliers ($a_{mn}$) are updated by the lower right triangle of the matrix. The $V_m$ value is replaced by the holding register supplied $U_m$ value as the $V_I$ BUS 901 and $V_Q$ BUS 902 input to the $a_{mn}$ updating elements. The $\gamma_I$ BUS 903 and $\gamma_Q$ BUS 904 supplied complex values are selected by a dual multiplexer to form complex product with the $U_m$ value. (The processor circuit's previous described complex multiplier configuration of four array multipliers and two adders is used.) A second dual multiplexer 97 enables the addition of each $U_m$ product to its corresponding a RAM supplied value. The a RAM value is then displaced by the resulting updated $a_{mn}'$ value. Each updated $a_{mn}'$ value of a matrix row is scaled through multiplication of both its in-phase and quadrature components times the scaled reciprocal of the updated $|\overline{U_m}|$ value calculation which was completed in the previous row. The reciprocal value is transferred into one of the input registers of each of the preprocessor circuit's remaining two array multipliers for use by the first $a_{mn}$ updating element of the row ($a'_{mn}=1$ in this element), and then maintained for use by the succeeding ($a_{mn}$ updating) elements of that row.

The operation of the four remaining ALU's of the processor circuit during each row of the matrix is determined by the sign bits of the $U_m$ value calculation completed in the previous row. (These sign bits are obtained with appropriate delay from the $U_m$ holding registers). The complex value resulting in each element is equal to its scaled $a_{mn}$ value multiplied by the signum of the indicated $U_m$ value and summed with the value which was calculated by the previous element of the row). The resultant $\gamma$ is entered into a dual shift register to make it available to the $\gamma_I$ BUS 903 and $\gamma_Q$ BUS 904, and for similar summation in the next element of the same column.

The last two rows of the matrix update the center ($a_{7n}$) and difference ($b_{7n}$) equalizing weights of the combiner. The $U_m$ signal is replaced by the center error signal ($\epsilon_a$) and the $V_I$ BUS 901 and $V_Q$ BUS 902 input to the elements during the penultimate row, and then is replaced by the difference error signal ($\epsilon_b$) during the final row. The reciprocal value is maintained equal to zero during these rows in order to not alter the element's input values.

As each updated weight is calculated, it is provided to the $W_I$ BUS 905 and $W_Q$ BUS 906 for transfer to the equalizer/combiner weight control circuitry. (The combiner dc offset weight is transferred to the error generator circuits for subtraction as a dc offset signal from the digitized combiner signal.)

The operation of a 19-port processor (18 signals plus 1 port to remove dc offset) with one combiner error signal can be illustrated by expansion of the matrix of FIG. 10 to a total of 19 columns by 21 rows.

This matrix is implemented in three parallel digital processor circuits 24A, 24B and 24C. The circuits are connected in a ring at each of the four points indicated in FIG. 9 (by a dotted x to y path) with the x output of each circuit connected to the y input of the next circuit.

The circuits 24A, 24B and 24C implement three contiguous elements at a time, with each circuit assigned to every third element of a row. In total, each circuit implements the elements of every third upper right to lower left diagonal of the matrix.

This configuration thus enables the required access to each element multiplier ($a_{mn}$) by a cross-connection between two of the circuits at the points indicated by :xx.

This configuration also results in all of the final value of the uncorrelated signals ($U_m$) being calculated by the same circuit. Thus, the dual $U_m$ holding register and circuitry associated with generation of the scaled reciprocal of the $|\overline{U_m}|$ value ($|\overline{U}|$RAM, ROM, and associated adder and registers) need only reside in one of the three circuits, with the indicated point z common to the three circuits. (The $V_I$ BUS 901 and $V_Q$ BUS 902 are each also common to the three circuits.)

Figure 12:
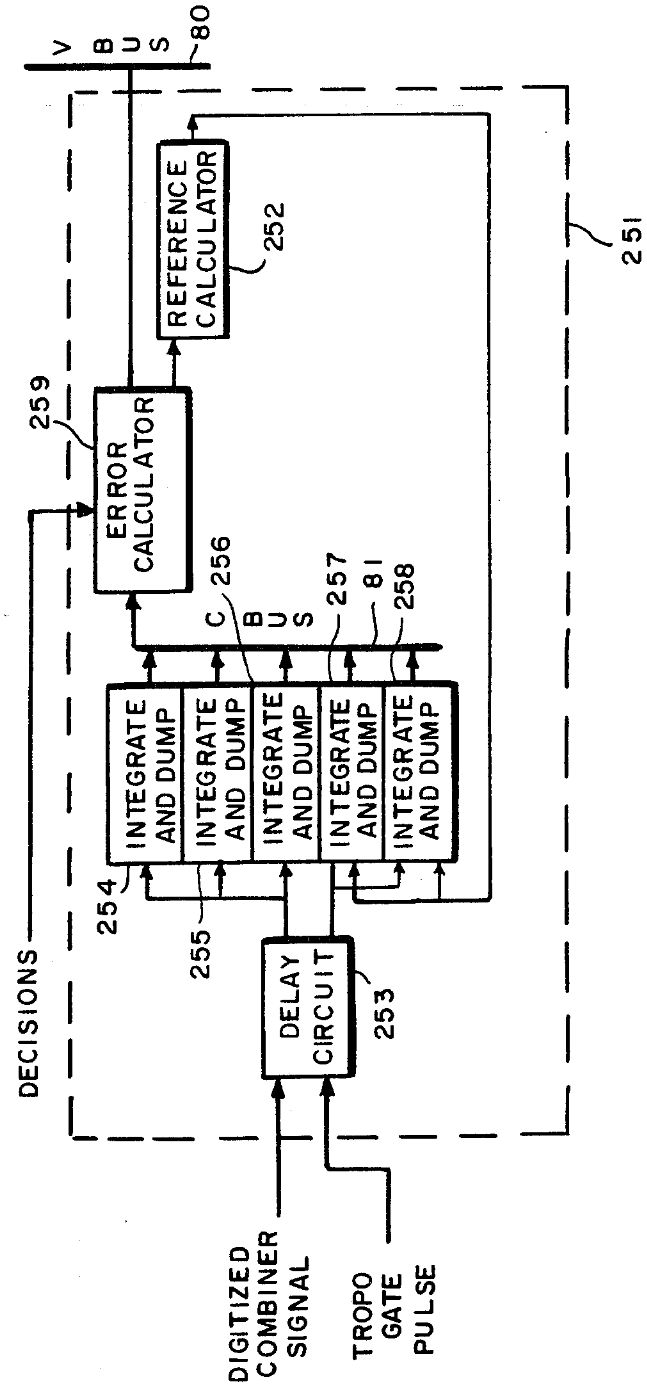
FIG. 12 is a block diagram of the error generator used in FIG. 7.

FIG. 12 is a block diagram of the error generator 251 which is used in FIG. 7. The error signal values are used by the parallel digital processor to update the weight control values for the combiner. These values are determined by the error generator circuits utilizing the digitized combiner output signal and the modem's decision and timing signals.

The error generator 251 consists of a delay circuit 253, five integrate-and-dump circuits 254–258, an error calculator circuit 259, and a reference calculator circuit 252.

The delay circuit 253 provides each value of the digitized combiner signal samples (center sample) along with the difference between its preceding and following sample values (difference sample). This circuit also provides the corresponding center and difference samples of a two level (0 and +1 value) reference pulse (gate pulse).

The integrate-and-dump circuits 254–258 multiply each of the delay circuits outputs by a designated scrambling or weighting function and then integrate the results for each baud interval.

The error calculator circuit 259 utilizes the integrated values and modem 30 decisions to form a center error ($\epsilon_a$), difference error ($\epsilon_b$), and data striped reference value (r) for each baud interval, and then integrates each of these during the multiple baud processing cycle of the parallel digital preprocessor 24. (This cycle corresponds to the integration period of the input control circuit.)

The reference calculator circuit 252 filters the integrated reference value (r), and then provides its corresponding limited value (R) for use in weighting the center and difference samples of the gate pulse.

A counter (shaper), in the delay circuit 253 is used to reproduce the modem 30 generated gate pulse with its timing coincident to that of the pulse contents of the digitized combiner 22 signal. Each gate pulse initiates the counter to count the A/D sampling clock pulses. The counter reproduces the gate pulse during a selected portion of its count states, completes its count cycle, and then stops.

Each reproduced pulse is delayed two A/D sample clock periods by a two word register (with 1 bit per register). The delayed gate pulse is then used to gate a two level scrambling signal. The resultant two bit values indicate the ±1 value of the scrambling signal when the delayed pulse is present, and zeo between delayed pulses. This output is provided to the fourth integrate 257 and dump circuit as the scrambled center sample of the gate pulse.

The (two bit) gate pulse difference sample indications (±1 or 0) are formed by logic gates and delayed an additional A/D sample clock period by a third register (of 2 parallel bits). The delayed difference sample is then scrambled (multiplied by the scrambe signal indication) by logic gates and provided to the fifth integrate and dump circuit 258.

Each of the integrate and dump (I&D) circuits 254–258 consist of 2 (16 bit) arithmeti logic units (ALU), an (32 bit) accumulator, and a (32 bit) holding register. The value in the accumulator is replaced by its ALU summation with each incident value by each A/D sample clock pulse. At the end of each baud interval, the last summation is entered into the holding register and the accumulator is cleared. The last summation (integrated value) is then maintained in the holding register during the next baud interval and multiplexed onto the $C_I$ BUS and $C_Q$ BUS in the C BUS 81 when required by the error calculator circuit 259.

The first integrate and dump circuit 254 integrates the delayed center samples of the combiner values by always adding them to its accumulator value. The second and third integrate and dump circuits 255 and 256 each integrate the scrambled version of its incident delayed center sample, or delayed difference sample, of the combiner values by a sequence of addition or subtraction of each of these values to its accumulator value. The selection of addition or subtraction is controlled by the indication (±1) of the scrambling signal.

The fourth and fifth integrate and dump circuits 257 and 258 each integrate a three-level (±1 or 1) scrambled version of the reference calculator supplied limited reference value (R). The scrambled center sample of the gate pulse is used to control the addition or subtraction of the limited reference value, or of zero, to the accumulator value in the fourth integrate and dump circuit. The scrambed difference sample of the gate pulse is used to control the addition or subtraction of the limited reference value, or of zero, to the accumulator value in the fifth integrate and dump circuit.

The error calculator 259 performs a total of five summations during each baud interval. These summations are implemented sequentially by a common hardware configuration as the input values are made available through the $C_I$ BUS and $C_Q$ BUS in the C BUS 81.

Figure 13:
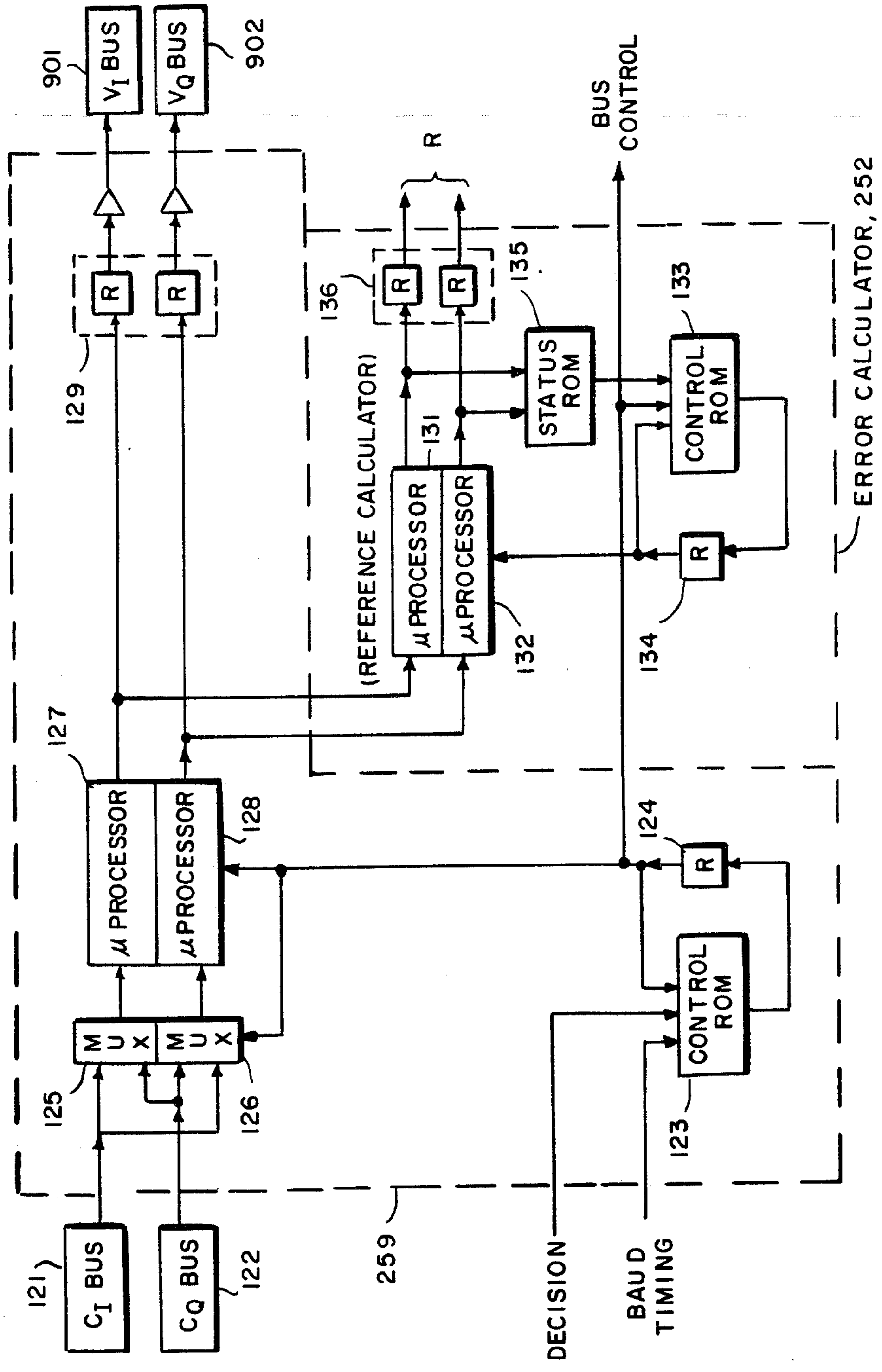
FIG. 13 is a block diagram of the error calculator and reference generator used in FIG. 7.

As illustrated in FIG. 13, the error calculator 259 consists of two (16 bit) one-of-two multiplexers 125 and 126 (two (16 bit) microprocessors 127 and 128, a control ROM 123 and program register 124 and a (32 bit) bus register 129.

Each microprocessor 127 and 128 (which is composed of four Am 2901 four-bit slice microprocessor circuits, or it equivalent) contains an 8-function arithmetic logic unit (ALU), a 16 word two port random access memory (RAM), a processing register and associated shifting, decoding and multiplexing circuitry.

The control ROM 123 contains a sequence of instructions which are transferred to the program register to control operation of the microprocessors, multiplexer, and bus register (of the error calculator) and to control the multiplexing of the integrate and dump holding register contents onto the $C_I$ BUS and $C_Q$ BUS. Each instruction also contains an indication which is combined with the modem decision indication to address the next instruction in the control ROM 123.

The multiplexers 125 and 126 receive the I and Q data and are used to exchange the in-phase and quadrature components of the input value when required by the modem decision multiplication.

Two locations in each microprocessor RAM are allocated to each of the three values generated and integrated by the error calculator (r, $\epsilon_a$ and $\epsilon_b$). One of each pair functions as an accumulator, and the other functions as a holding register.

The center sample of the combiner values (from the first I&D circuit) is applied to the $C_I$ BUS 121 and $C_Q$ BUS 122 at the beginning of the baud interval. If the in-phase and quadarature indications of the decision are in agreement, the in-phase and quadrature components of the center sample are passed directly through the multiplexer to the corresponding in-phase and quadrature microprocessor ALU. If the in-phase and quadarature indications of the decision are differene, the multiplexer will pass the in-phase component of the center sample to the quadrature ALU and the quadrature component to the in-phase ALU in the microprocessor 127 and 128.

The multiplexer directed components are independently added or subtracted (by the microprocessor ALUs) to the RAM supplied r accumulator component value under control of the respective components of the decision indications. A postive in-phase decision indication dictates an addition, and a negative in-phase decision dictates a subtraction, by the in-phase ALU. A positive quadrature decision indication dictates a subtraction, and a negative quadrature decision indication dictates an addition by the quadrature ALU. The r accumulator component values are then replaced by the respective sum or difference.

The reference value generated from the preceeding operation has a resultant bias phase of −45° C. This bias phase is similarly removed by the conjugate of this operation during the following procedure.

The second value applied to the $C_I$ BUS 121 and $C_Q$ BUS 122 is then scrambled center sample of the combiner values (from the second I&D circuit). The components of this value are each passed directly through the multiplexers to the corresponding microprocessor ALU and added to the corresponding RAM supplied $\epsilon_a$ accumulator component value. Each result is then temporarily stored in the microprocessor processing register.

The center pulse gated, and scrambled, limited reference value (from the fourth I&D circuit) is then applied to the $C_I$ BUS 121 and $C_Q$ BUS 122. In similar procedure to that used for the first value applied to the $C_I$ BUS 121 and $C_Q$ BUS 122, the in-phase components are each passed directly through the multiplexers to the corresponding microprocessor ALU when the components of the decision indication are in agreement. They are exchanged and each passed through the multiplexers to the alternate microprocessor ALU when the components of the decision indication are different.

Each in-phase or quadrature microprocessor ALU adds its multiplexer directed input to its associated processing register when the corresponding in-phase or quadrature decision indication is positive. If the indication is negative, a subtraction is directed.

The $\epsilon_a$ accumulator value is replaced by the results of this third error calculator summation.

The scrambled difference sample of the combiner values (from the third I&D circuit 256 of FIG. 12 is applied fourth to the $C_I$ BUS and $C_Q$ BUS. The components of this value are each passed directly through the multiplexers to the corresponding microprocessor ALU and then added to the corresponding RAM supplied $\epsilon_b$ accumulator component. Each result is then stored in the microprocessor processing register.

The difference pulse gated, and scrambled, limited reference value (from the fifth I&D circuit 258 of FIG. 12) is applied last to the $C_I$ BUS and $C_Q$ BUS 122. Each component of this value is either passed through the multiplexers 125 and 126 diredctly to the corresponding microprocessor 128 and 128 ALU, or exchanged and passed to the alternate microprocessor ALU, when the components of the decision indication are correspondingly in agreement, or different. When the in-phase or quadrature decision indication is positive, the corresponding in-hase or quadrature microprocessor ALU adds its multiplexer directed input to its associated processing register; andd when the indication is negative a corresponding subtraction is directed.

The $\epsilon_b$ accumulator value is replaced by the results of this last (fifth) error calculator summation.

The three values are integrated in the designated RAM accumulators during the processing cycle of the parallel digital preprocessor 24B. During the last baud interval of this cycle, each updated value or r, $\epsilon_a$, or $\epsilon_b$ (which result from the first, third, and fifth summation) is transferred to the designated RAM holding register instead of the RAM accumulator. The RAM supplied accumulator values are then replaced by a value of zero during the first, second and fourth summation of following baud interval (the first baud interval of the preprocessor cycle).

The reference calculator configuration 252 is illustrated in FIG. 13. It consists of two (16 bit) microprocessors 131 and 132, a control ROM 133 and program register 134, a status ROM 135, and a (32 bit) reference register 136.

The microprocessor 131 and 132 are similar to those used in the error calculator circuit; containing an 8 function arithmetic logic unit (ALU), 16 word two-port random access memory (RAM), processing register, and associated shifting, decoding and multiplexing circuitry.

The control ROM 133 contains a sequence of instructions which are transferred to the program register to control operation of the microprocessors and reference register. Each instruction also contains an indication which is combined with the status ROM 135 indication to address the next instruction in the control ROM 133.

A location in each microprocessor RAM in 131 and 132 is allocated from storage of its associated component of the filtered reference value (r').

The error calculator 251 generates an indication when it is about to transfer an integrated reference value (r) to the reference calculator circuit. This indicator initiates the r' filter instruction sequence of the error calculator by presetting the control ROM address portion of the program register.

Each in-phase or quadrature component of the calculator supplied r value is then subtracted from its corresponding microprocessor RAM supplied r' value component by the ALU. One half of the difference (differene shifted one bit position to the right) is transferred to the processing register. The value in each processing register is then repeatedly divided by 2 several more times (as programmed according to the filter time constant implemented).

The final contents of the proessing registers is subtracted from the RAM supplied r' value. The RAM stored r' value is then replaced by the difference value (updated r' value).

The updated r' value is copied into a second RAM location. This location is monitored by the status ROM 135 to determine the next instruction to be selected from the limiter instruction sequence.

As described above, the error calculator circuit 251 utilizes the integrated values and modem 30 decision to form a center error ($\epsilon_a$), difference error ($\epsilon_b$), and data striped reference value (r) for each baud interval, and then integrates each of these during the multiple baud processing cycle of the parallel digital preprocessor 24B.

The reference calculator circuit 252 filters the integrated reference value (r), and then provides its corresponding limited value (R) for use by the error calculator circuit in weighting the center and difference error signals.

The error signal values are used by the parallel digital processor 24 to update the weight control values for the combiner 22. These values are determined by the error generator circuits utilizing the digitized combiner output signal and the modem's 30 decision and timing signals.

The above described device results in an "anti-jamming" system that causes the received antenna pattern to have nulls directed towards jammers while maximizing the gain of desirable signals like the prior art device in FIG. 3. Unlike the prior art device in FIG. 3, which uses the LMS algorithm, the parallel processor configuration will not exhibit the slow rates of adaptation when intefering sources of widely-different strengths are present. The described invention overcomes this slow convergence by employing a signal processing operation carried out in parallel with the basic combining action of the adaptive array. Practicality and applicability to wide bandwidth applications are assured because the parallel processing allows a digital signal processing implementation.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A signal processing system receiving detected signals from the subarray sensors of an adaptive phased array and delivering to the array data processing system an output of weighted sensor signal, said weighted sensor signals having the signal components of multiple jamming sources in said detected signals nulled and maximizing the gain of desirable components of said detected signals, said signal processing system comprising:

a parallel analog combiner receiving said detected signals from said subarray sensors of an adaptive phased array, said parallel analog combiner applying a first set of output weights to each of said detected signals from each of said subarray sensors, and combining the resultant weighted analog signals into the combiner output signal, said parallel analog combiner producing said first set of output weights by combining a first set of output weight change values with its first set of old output weight values;

an error generator receiving said combiner output signal and one of said detected signals which is used as a reference signal and generating an error signal;

a parallel processor receiving said detected signals from said subarray sensor, said parallel processor producing a second set of output weights to said detected signals and producing said output of weighted sensor signals to said array data processing system; said processing producing said second set of output weights by combining a second set of output weight change values with its second set of old output weight values; and an algorithm circuit receiving said error signal from said error generator and said weighted output signals from said parallel processor and providing a first set of output weight change values to said parallel analog combiner, and a second set of output weight change values to said parallel processor.

2. A signal processing system as defined in claim 1 wherein the algorithm used by said algorithm circuit that continually provides said first and second sets of output weight change values $\Delta_{mn+1}$, n where:

$$\Delta_{mn}=\gamma_{mn}U_m$$

where $U_m$ is said weighted output signal from said parallel processor, and $\gamma_{mn}$ is the error signal received from said error generator and $$\gamma_{m+1,n}=\gamma_{mn}-(A_{mn}+\Delta_{mn})g^*(U_m)$$

n being an integer equal to the number of said out array sensors in said adaptive phased array and $\Delta_{mn}$ equals said first and second sets of output weights and g(*) is an non linear fucntion performed on $U_m$ such that $$g(U_m)=\frac{Sgn(X_m)+j\,Sgn(Y_m)}{(|X_m|+|Y_m|)}$$

and $\gamma_{m+1,m}=g^*(U_m)$

3. A signal processing circuit as defined in claim 2 wherein said algorithm circuit comprises:

a non linear element performing said g(*) function of said said weighted output signals from said parallel processor ($U_m$) to produce a non-linear signal;

first and second complex multiplying circuits, said first complex multiplying circuit multiplying said second set of weighted output signals from said parallel processor ($U_m$) with said error signal received from said error generator ($\gamma_{mn}$) and producing a first complex product signal;

an accumulator which transmits said complex product signal to said second complex multiplying circuit, said second complex multiplying circuit multiplying said complex product signal with said non linear signal and producing a second complex product signal; and a summing means combining said second complex product signal with said error signal received from said error generator, said summing means producing said first and second sets of output weight change values.

4. A signal processing system as defined in claim 3 wherein said error generator is a summing juntion producing said error signal by subtracting said combiner output signal from said reference signal.

5. A signal processing system as defined in claim 4 wherein said parallel analog combiner comprises:

n analog combiners, n being an integer equal in value to the number subarray sensors in said adaptive phased array.

6. A signal processing system as defined in claim 5 wherein each of said n analog combiners comprises:

an accumulator combining said first set of output weight change values with said first set of old output weight values to produce said set of output weight values;

a third complex multiplying circuit receiving one of said detected signals from one of said subarray sensors of said adpative phased array, and its updated value of said first set of output weights from said accumulator and producing its resultant weighted analog signal.

7. A signal processing system as defined in claim 4 wherein said parallel processor comprises: N rows of m parallel analog combiners, m being an integer defined by the equation:

$$M = \sum_{q=1}^{n} (q-1)$$

where N equals the number of said subarray sensors in said adaptive array and each of N of said subarray sensors sends its said detected signal in a parallel circuit into r parallel analog combiners, r being an integer defined by the equation:

$$r = \{(N-q); q-1, 2, \ldots N-1\};$$

and a plurality of summing means producing said second set of weighted output signals by combining each of N said detected signals for said subarray sensors with said output weighted sensor signals produced by the (N−1) row of parallel analog combiners.

8. A signal processing system as defined in claim 7 wherein each of said parallel processors comprises:

an accumulator combining said second set of output weight change values with said second set of old output weight values to produce said second set of output weight values;

and a fourth complex multiplying circuit receiving one of said detected signals from one of said subarray sensor, and its updated value of said second set of output weights from said accumulator and producing its resultant of said output weighted sensor signals by multiplying its received said detected signal by its corresponding of said second set of output weight values.

9. A signal processing system as defined in claim 8 including:

a reference calculator circuit receiving a reference value signal and developing a calculator reference value signal; and an error calculator means containing said error generator, said error calculator means receiving said combiner output signal from said parallel analog combiner and In-phase and Quadrature data streams from said array processing system, said error calculator means developing and sending said reference value signal to said reference calculator and receiving said calculator reference value signal, said error calculator means processing said reference value signal into said reference signal, said error calculator means producing and sending said error signal to said parallel processor.

10. A signal processing system as defined in claim 9 wherein said error calculator means comprises:

a delay circuit receiving said combiner output signal from said parallel analog combiner and said In-phase and said Quadrature data stream from said array processing system and producing an output delay signal;

first, second, third, fourth, and fifth integrate and dump signals receiving said output delay signal and multiplying said output delay signal by weighting functions and outputting integrated value signals and modem decision signals; said fourth and fifth integrate and dump circuits receiving sad calculator reference value signal from said reference calculator and producing said reference signal;

an error calculator circuit receiving said reference signal, said integrated value signals and said modem decision signals and producing and sending said reference value signal to said reference calculator circuit, said error calculator circuit producing and sending said error signal to said parallel processor.

11. A signal processing system as defined in claim 10 wherein said reference calculator circuit comprises:

first and second reference microprocessors receiving said reference value signal from said error calculator circuit and producing said calculator reference value signal;

a reference control Read Only Memory containing control instructions and sending a control signal to control said first and second reference microprocessors, said reference control Read Only Memory receiving a decision signal from said error calculatorr circuit implementing said control instructions;

a program register receiving said control signal from said reference control Read Only Memory and controlling said first and second microprocessors; and a reference register receiving said calculator reference value signal from said first and second reference microprocessors and sending said calculator reference value signal to said fourth and fifth integrate and dump circuits.

12. A signal processing system as defined in claim 11 wherein said error calculator circuit comprises:

first and second error multiplexers receiving said integrated value signals and producing an error value by exchanging In-phase and quadrature signal components in said integrated value signals;

first and second error microprocessors receiving said error value signals from said first and second multiplexers and producing said error signal;

an error control Read Only Memory receiving said modem decision signals and controlling first and second error multiplexers, said first and second error microprocessors and said reference control Read Only Memory by sending said decision signal;

a program register receiving said decision signal from said error control Read Only Memory and sending said decision signal to said first and second error multiplexers, said first and second error microprocessors, and said reference control Read Only Memory;

and a bus register receiving said error signal from said first and second microprocessor and sending said error signal to said parallel processor.

* * * * *